Jan. 23, 1968          W. HELBLING                3,365,370
              PRESSURE TUBES FOR NUCLEAR REACTORS
Filed Jan. 22, 1965                              6 Sheets-Sheet 1
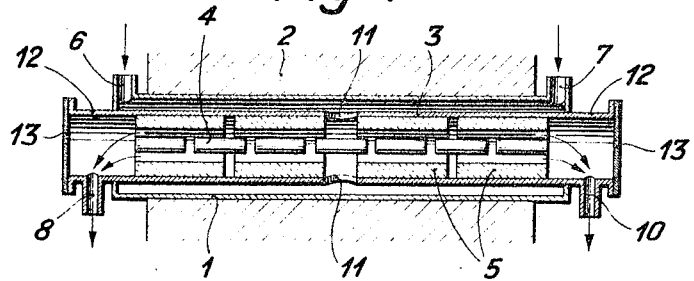
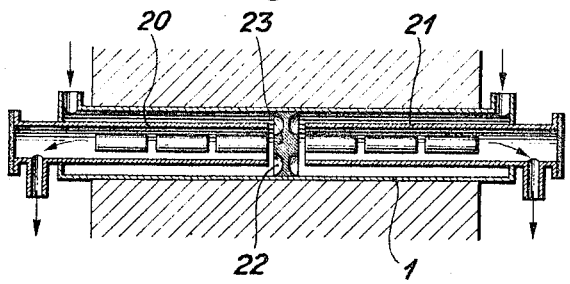
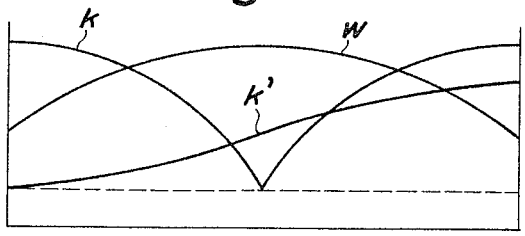
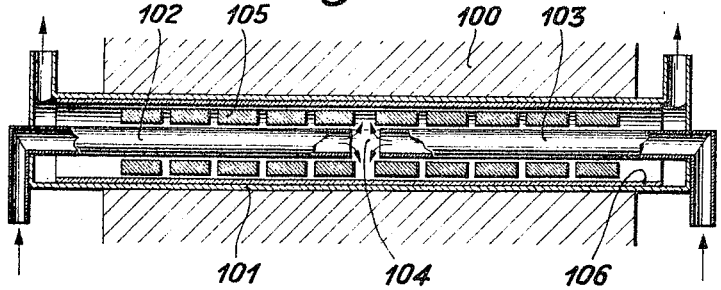
Inventor:
Willy Helbling
BY Pennie, Edmonds,
Morton, Taylor and Adams
ATTORNEYS Jan. 23, 1968  W. HELBLING  3,365,370
PRESSURE TUBES FOR NUCLEAR REACTORS
Filed Jan. 22, 1965  6 Sheets-Sheet 2

Inventor:
Willy Helbling
BY Pennie, Edmonds,
Morton, Taylor and Adams
ATTORNEYS

Jan. 23, 1968 W. HELBLING 3,365,370
PRESSURE TUBES FOR NUCLEAR REACTORS
Filed Jan. 22, 1965 6 Sheets-Sheet 4

Inventor:
Willy Helbling
BY Pennie, Edmonds,
Morton, Taylor and Adams
ATTORNEYS

Inventor:
Willy Helbling

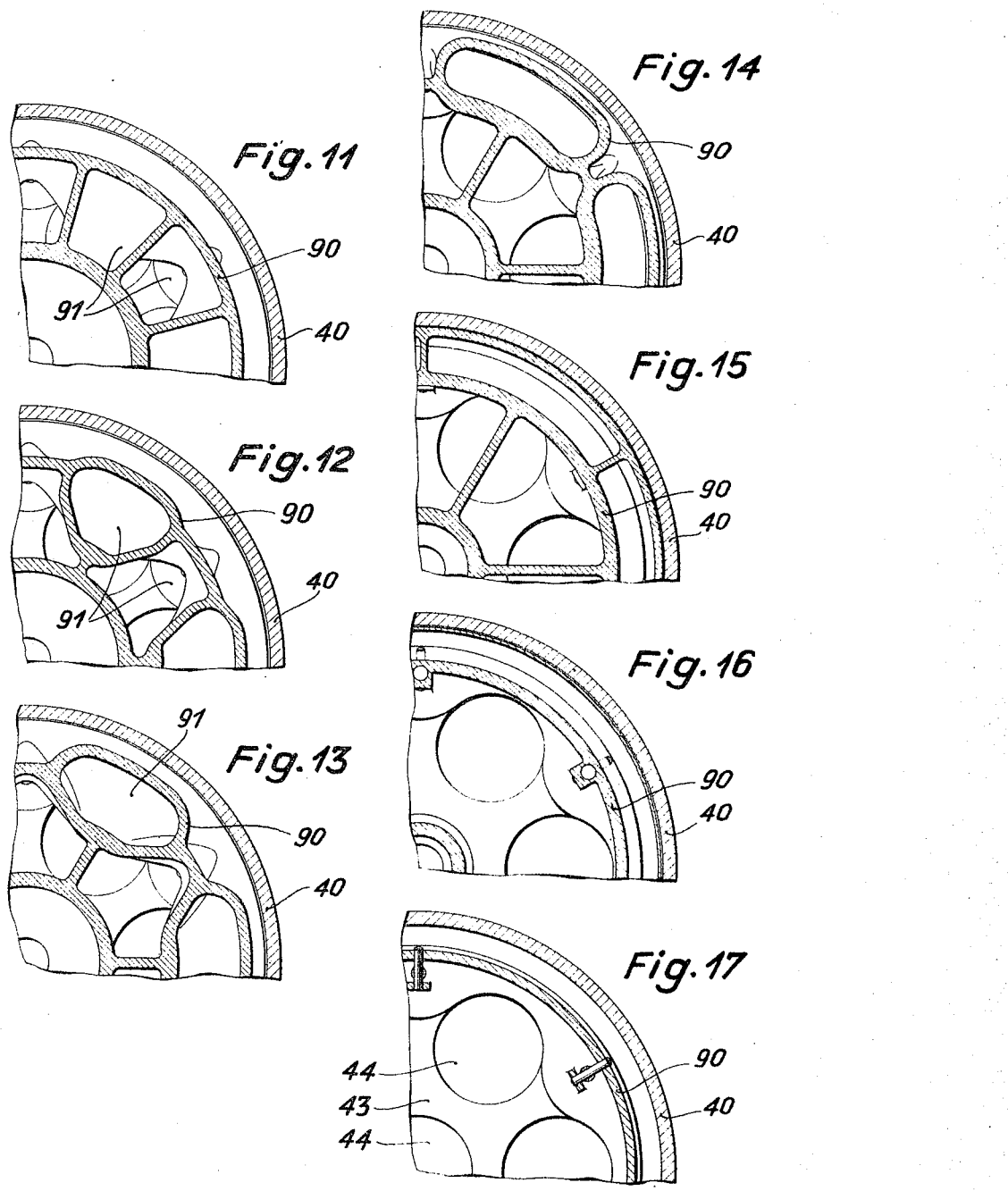

United States Patent Office 3,365,370
Patented Jan. 23, 1968

3,365,370
PRESSURE TUBES FOR NUCLEAR REACTORS
Willy Helbling, Winterthur, Switzerland, assignor to Sulzer Brothers Limited, Winterthur, Switzerland, a Swiss company
Filed Jan. 22, 1965, Ser. No. 427,428
Claims priority, application Switzerland, Jan. 28, 1964, 816/64
1 Claim. (Cl. 176—59)

The present invention pertains to a nuclear reactor having tubes subjected to internal pressure which are disposed in the moderator portion of the reactor and which contain fissionable material and which are traversed by the reactor coolant medium. For brevity, such tubes will hereinafter be called "pressure tubes."

Nuclear reactors are known in which the reactor coolant medium traverses the pressure tubes from end to end for abstraction of heat from the fissionable material therein. The reactor coolant enters the tubes at low temperature at one end and emerges at a higher temperature at the other end. The evolution of heat is, however, not uniform along the length of the tube and is at a maximum in the middle thereof. In known constructions of reactors having pressure tubes, the reactor coolant has a relatively high temperature at this mid-point, where an intensive cooling would be desirable, the coolant no longer possessing the low temperature at which it entered. Hence, the take-up of heat is rendered difficult at the point of maximum heat evolution. In order to provide nevertheless a sufficient cooling of the fissionable material, the reactor coolant medium must possess a relatively low temperature even at the outlet end of the pressure tube which entails thermodynamic disadvantages.

Atomic nuclear reactors having pressure tubes are also known in which the reactor coolant is introduced into a pressure tube at one end and is also withdrawn at the same end, a reversal in the flow of coolant taking place at the other end of the tube. This arrangement also is subject to the same disadvantages.

According to the invention these disadvantages are avoided in that the coolant is supplied to the pressure tubes at at least one end, is conducted to the center of the reactor core inside the pressure tube by means of at least one channel containing no fissionable material, and is there conducted into channels which contain fissionable material, which latter channels lead in part to one end and in part to the other end of the pressure tube. Lastly, the heated coolant is withdrawn at both ends of the pressure tube after passing through these channels.

The invention will now be described in further detail by reference to the accompanying drawings illustrating exemplary embodiments of the invention, and in which:

FIG. 1 is a schematic representation of a first embodiment of a pressure tube according to the invention;

FIG. 2 is a diagrammatic representation similar to that of FIG. 1 but showing a modified form of pressure tube;

FIG. 3 is a graph useful in explaining the invention;

FIGS. 10–17 are sectional views taken on the lines X—X, XI—XI, XII—XII, XIII—XIII, XIV—XIV, XV—XV, XVI—XVI and XVII—XVII in FIG. 9; and FIG. 18 is a further diagrammatic view similar to that of FIGS. 1 and 2 but showing still another embodiment of the invention.

Figure 4:
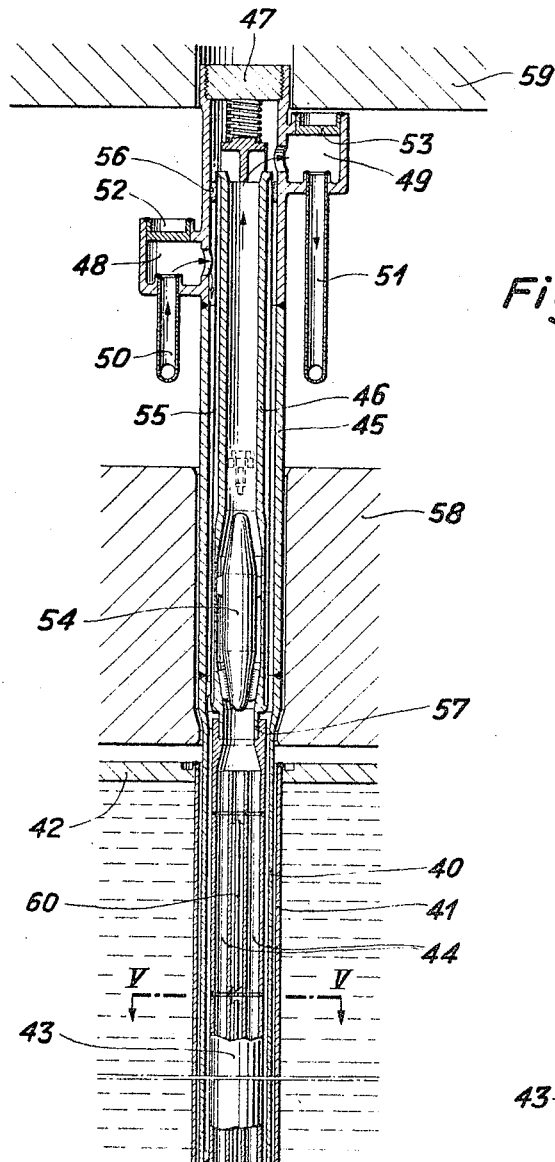
FIG. 4 is a view, partially in axial section, through one-half of the length of a pressure tube according to the invention.

Each of FIGS. 1 and 2 shows only a single pressure tube, although, as is well-known, a nuclear reactor includes a large number of such tubes. The tube shown in FIG. 1 is built into a moderator part 2 of a reactor. The pressure tube 1, which is built of sufficient strength to withstand the pressure of the reactor coolant medium, contains an inner tube 3 in which bodies 4 of fissionable material are disposed. As is shown in FIG. 1, the bodies 4 may be surrounded by pieces 5 of heat insulating material having low neutron absorption, materials such as graphite suitable for use as moderators being suitable here also. The inlet or inflow of the reactor coolant medium occurs at the two ends of the tube via tubular connections 6 and 7, opening into and intermediate space between the pressure tube 1 and the inner tube 3. Withdrawal or outflow of the heated reactor coolant is effected through connecting tubes 8 and 10 which open into the interior space of the inner tube 3. In order to make possible passage of the reactor coolant medium from the intermediate space between tubes 1 and 3 into the inside of inner tube 3, the inner tube is provided with openings 11 disposed in the middle of the reactor core when the tube is built into the reactor. The inner tube 3 is provided with pressure ends 12 capable of withstanding the pressure of the coolant and which extend out from the pressure tube 1 itself and which are closed off with covers 13.

In the embodiment of FIG. 1 the reactor coolant medium, which may be a gas, passes at the same pressure through the connecting tubes 6 and 7 into the pressure tube 1. The coolant then flows through the intermediate space between the tubes 1 and 3 toward the middle or core of the reactor. Since in so flowing the coolant does not come into direct contact with parts which participate in the evolution of heat, the medium is not substantially heated during this passage. Hence, the temperature of the pressure tube is held at a relatively low level, which is advantageous for the physical integrity thereof. In the middle of the pressure tube the coolant medium then flows through the openings 11 into the inside of the inner tube 3 and flows past the bodies 4 of fissionable material. The coolant abstracts heat therefrom and thereby cools them. The take-up of heat is most intensive in the middle of the reactor, where the evolution of heat in the fissionable material is most intensive. With increasing distance from the middle of the reactor the cooling effect of the coolant declines but so does the evolution of heat. The heated coolant is thereupon withdrawn or flows out of the pressure tube, at both ends thereof, via the connecting tubes 8 and 10 simultaneously. It is thence conducted in known fashion to other elements of the installation where this heat is employed.

In the construction according to the invention it is only the relatively cool pressure tube 1 which must withstand the high pressure of the coolant medium. The inner tube which can assume higher temperatures is not subjected to substantial pressure differences. It is also possible to reduce the temperature of the inner tube by providing it on the inner surface thereof with a heat insulating layer. Such layer also prevents the coolant medium from being significantly heated in its passage from the exterior to the middle of the reactor, i.e., from the ends of tube 1 to openings 11 in tube 3. Such heating would be thermodynamically disadvantageous. A heat insulating layer may indeed be applied on the pressure tube 1 itself. In this way, together with the mode of flow provided for the coolant by the invention, the introduction of heat into the pressure tube is so reduced that it is possible to have it bathed directly with a liquid moderator and hence to cool it from the exterior.

Replacement of the fissionable material can be effected in the embodiment according to FIG. 1 from either end of the tube by removal of one or the other of the covers 13. This replacement can indeed take place during full operation of the system if provision is made, as for example by means of a gas-tight closure between the pressure tube and the replacement apparatus, to preclude escape of all reactor coolant. Advantageously upon such replacement a body 4 of fissionable material is inserted into one end of the tube, the whole row of bodies 4 being pushed along in order to effect removal of one such body at the other end. If this process is carried out from opposite sides in adjacent tubes, an optimum employment of the bodies of fissionable material will be achieved.

The construction of pressure tubes according to the invention has moreover the advantage that by reason of the introduction of the coolant from both ends it is only one-half of the coolant which is introduced at either end. There are in consequence lower pressure losses or, for given pressure losses, the cross-sections of the channels can be reduced. This is advantageous in a number of respects concerning the construction of the reactor. Thus for example with a given quantity of fissionable material, the quantity of structure disposed in the reactor but not taking part in the reactor processes can be reduced, and in addition the pressure tubes may be disposed more closely to each other. Additionally, upon a reduction in the cross-section of the flow channels for the coolant there is effected by virtue of the increased streaming velocity of the coolant an improved transfer of heat from the fissionable material to the coolant.

The embodiment according to FIG. 2 differs from that of FIG. 1 in that the inner tube 3 is not constructed as a single integral element as in FIG. 1 but is rather composed of two parts 20 and 21 with an intermediate space 22 between them. A dividing partition 23 can be disposed in the space 22. The partition 23 need not close off the whole cross-section of the tube 1; it suffices if the partition diminishes the flow of coolant medium from one-half of the tube to the other. As illustrated in FIG. 2, the partition 23 can be so formed as to foster reversal in the direction of the flow of the coolant. The partition 23 can moreover suppress possible instability phenomena which might entail a non-uniform flow through the two halves of the pressure tube.

The mode of operation of the invention is indicated in FIG. 3. The curve $w$ represents approximately the variation in rate of heat evolution in the reactor along the length of the pressure tube. As is known, this heat evolution is substantially larger in the middle of the reactor than it is at the exterior portions thereof. With the pattern of coolant flow according to the prior art from one end of the pressure tube to the other, there will be established a temperature variation in the coolant as indicated by the curve $k'$ (direction of flow being from left to right). As FIG. 3 indicates, with the flow pattern of the prior art the temperature of the cooling medium is relatively high in the middle of the pressure tube. Consequently, in order to prevent the temperature of the fissionable material from rising to dangerous levels, the temperature of the coolant medium in the middle of the pressure tube must be held to relatively low values, which implies a relatively low exit temperature therefor. In the arrangement according to the invention, which is characterized by a variation of temperatures as indicated by the curve $k$, the coolant medium reaches the middle portion of the pressure tube with its lowest temperature and can there most effectively cool the fissionable material, at the point of maximum heat evolution therein. In the flow of the coolant medium toward the ends of the pressure tube, the temperature of the coolant rises but simultaneously the rate of heat evolution in the fissionable material declines and therewith the temperature difference between the fissionable material and the coolant. The result, as indicated by curve $k$, is that with the same maximum temperatures for the fissionable material higher exit temperatures for the coolant are achieved.

FIG. 4 illustrates an embodiment of the invention in constructional detail. The pressure tube 40 is disposed within an outer tube 41 of a container 42 for heavy water serving as a moderator. The pressure tube 40 contains a guide body 43 which itself contains channels 44 for the receipt of bodies of fissionable material. The guide body 43 may advantageously be made entirely of solid material such as graphite having a low neutron absorption and, indeed, a moderating action. It can, however, be made of any ceramic material, such as aluminum or silicon oxide. These materials have also heat insulating properties so that the transfer of heat to the exterior of the guide body 43 is minimized. A tube 45 connects to the pressure tube 40 and a tube 46 connects to the guide body 43. The tube 45 is provided at one end with a lock 47 which is releasable and by means of which the pressure tube is closed in gas-tight fashion. The tube 45 connects laterally with chambers 48 and 49 to which are connected coolant circulating inlet and outlet tubes 50 and 51. The chambers 48 and 49 are provided with closure members 52 and 53 which may be welded thereto. Within the tube 46 there is disposed a body 54 of radiation shielding material. The flow of the coolant medium is indicated in FIG. 4 by means of arrows. The tube 46 is surrounded by a thin walled tube 55 and is welded thereto. The gaseous layer trapped between the tubes 46 and 55 serves as heat insulation between the coolant gas which has not and that which has been heated. Between the tube 55 and the tube 45 there is provided a packing or seal 56 which is fastened for example to the tube 45 and provides a sliding seal between tube 45 on the one hand and tubes 46 and 55 as a unit on the other hand. The tube 46 is coupled to the guide member 43 by means which may take the form of a thread, not shown, at the location 57. The flow connections and the tubes 50 and 51 for the coolant are disposed between two shielding walls 58 and 59.

Figure 5:
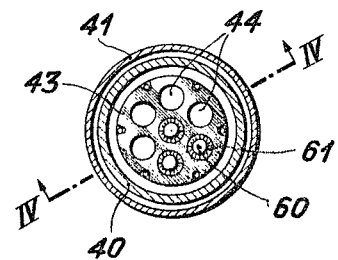
FIG. 5 is a sectional view taken on the line V—V in FIG. 4.

FIG. 5 shows at an enlarged scale a sectional view taken on the line V—V in FIG. 4. In channels 44 of the guide member 43 are disposed bodies 60 of fissionable material whose periphery is provided with coolant fins 61.

Figure 6:
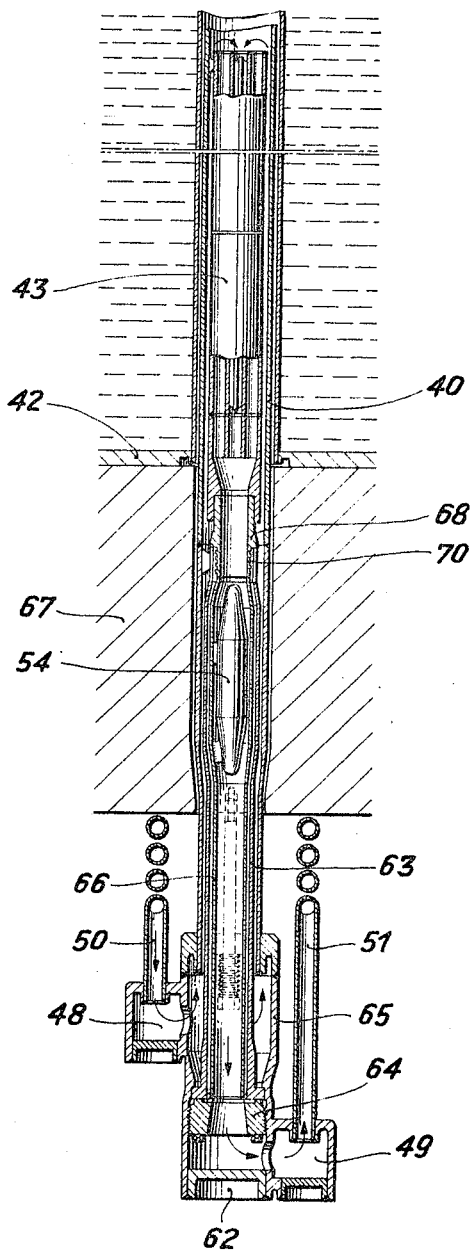
FIG. 6 is a view similar to that of FIG. 4 but showing the other half of the tube.

FIG. 6 shows the other half of the tube according to the invention of which one-half is shown in FIG. 4. The arrangement is substantially the same, and similar reference characters have been employed to designate corresponding elements of structure. The lower closure member or connection head includes in this example a welded sealing member 62. A tube 63 connects at the lower end thereof to the guide member 43 above it, and the tube 63 is fastened by means of a threaded ring 64 to a special cover or bell 65 which is welded to the lower end of the tube 40. The tube 63 is provided with an inner tube 66 for purposes of thermal insulation. As at the upper end of the installation seen in FIG. 4, there is provided in the tube 66 a body 54 for radiation shielding. As at the upper end, the bell 65 includes chambers 48 and 49 which connect to inlet and outlet conduits 50 and 51 for circulation of the coolant medium. The container 42 with the liquid moderator therein rests at the lower end on a shield 67 made of radiation shielding material.

In the embodiment according to FIGS. 4 and 6, the whole content of the pressure tube 45, so far as shown in FIG. 4, is removed upwardly when the fissionable material is to be renewed. To this end a changing device is applied to the upper end of the tube 45, the cover 47 is screwed off and the tube 46 with the guide body 43 extending to the middle of the pressure tube is withdrawn. During a large part of the withdrawal stroke, the seal 56 prevents a direct flow of coolant out of the tube 50 into the tube 51. In this way there is provided for a continued flow of the coolant. It is only toward the end of the withdrawal stroke when the fissionable material is outside the reactor core that this cooling must be interrupted. By that time however the heat evolution of the fissionable material is so low that special cooling can be dispensed with for a short period.

The guide member 43 disposed in the lower half of the pressure tube 45 and seen in FIG. 6 is for replacement likewise withdrawn with its fissionable material by the changing device, through the upper end of the tube. The necessary cooling during this process is effected by coolant gas which is provided by the exchanging device and introduced into tube 50. The supply of coolant through the tube 50 can in this event be briefly interrupted. In the lower part of FIG. 6 the tube 66 remains in its position with the body 54. To this end the guide body 43 is provided at its lower end with a part 68 which possesses a sliding seal 70 cooperating with the upper end of the tubes 63 and 66.

Figure 7:
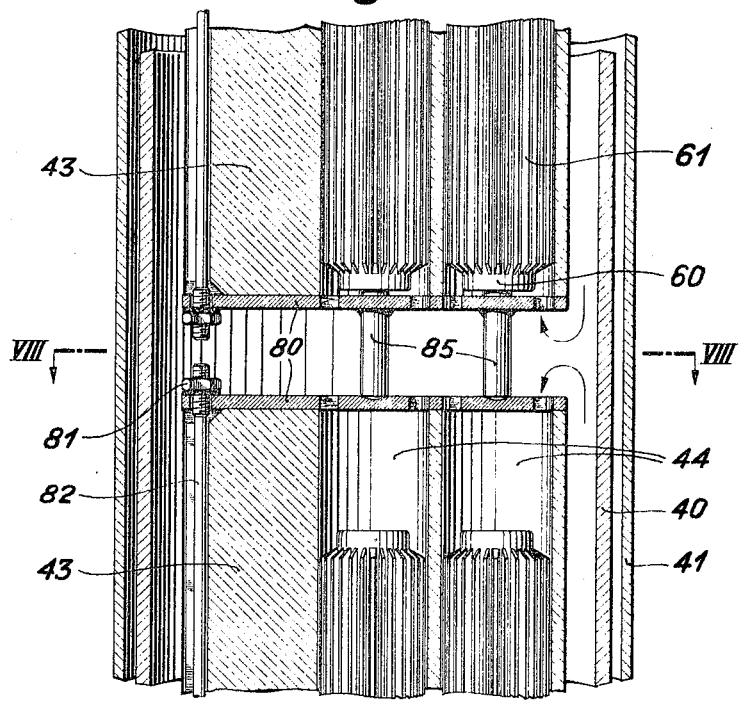
FIG. 7 is a sectional view at an enlarged scale of the middle portion of the tube of FIGS. 4–6.
Figure 8:
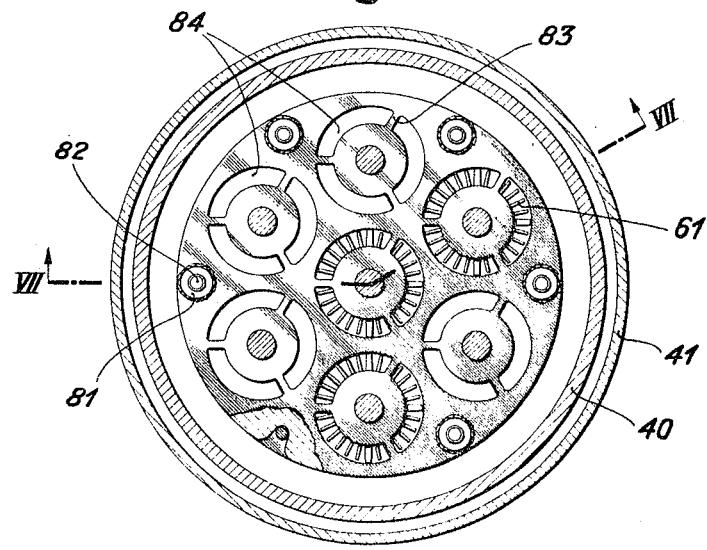
FIG. 8 is a sectional view taken on the line VIII—VIII in FIG. 7.
Figure 9:
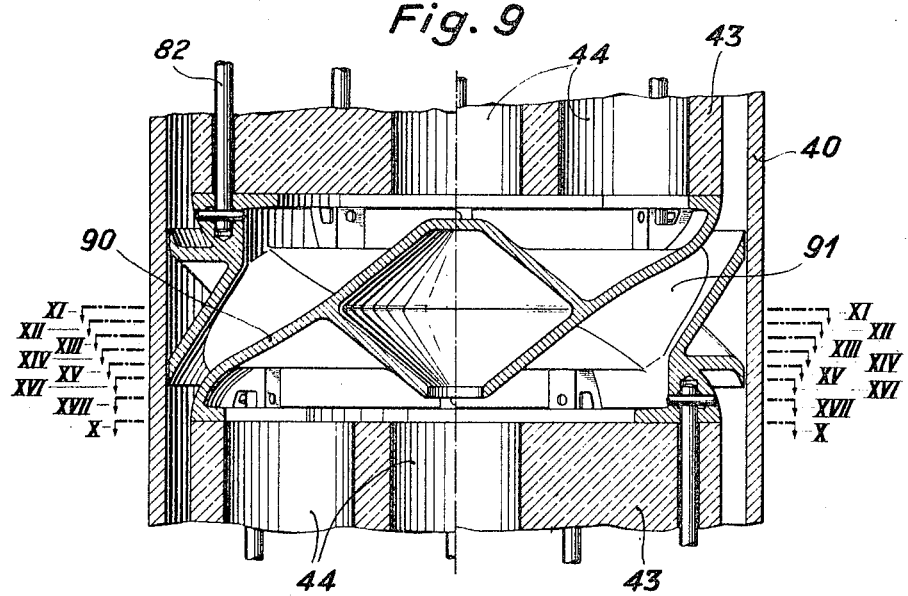
FIG. 9 is a sectional view similar to that of FIG. 7 but showing a modified pressure tube according to the invention.
Figure 10:
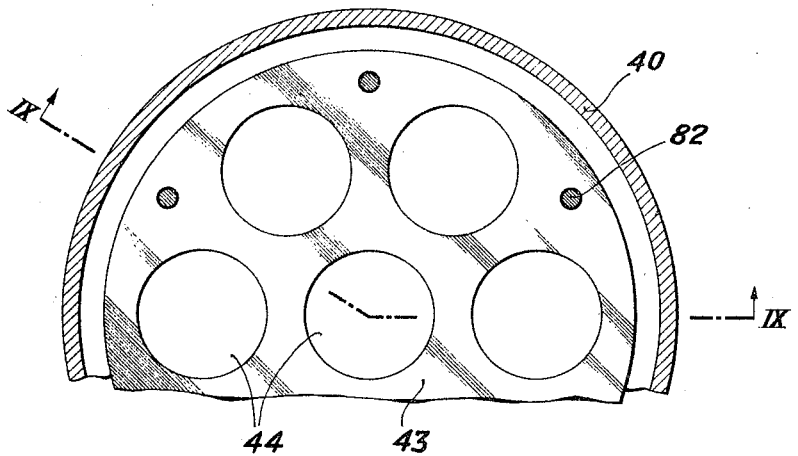

In FIGS. 7 and 8 the middle portion of the pressure tube of FIGS. 4 and 6 is shown at an enlarged scale. The guide members 43 are provided at their ends with metallic plates 80 against which the nuts 81 on anchoring bolts 82 are stressed. The bolts 82 each hold a separate one of plural graphite guide bodies 43. The plates 80 possess circular openings 84 interrupted by struts 83 and through these circular openings the coolant can flow into the channels 44. The upper plate 80 is provided with protuberant pins 85 which rest or bear against the upper plate 80 of the next lower guide member and serve to provide a spacing between the guide members 43. The gas flows through this space in the sense of the arrows, entering from the space between the guide members 43 and the tube 40 into the channels 44.

FIGS. 9 to 17 show similarly to FIGS. 7 and 8, the middle portion of another reactor coolant flow pressure tube according to the invention. In this embodiment the coolant enters the tube at both ends, the part of the coolant entering at each end flowing out at the other end. At each end, the coolant is introduced into the annular peripheral space between the pressure tube 40 and the guide body 43. In the middle of the pressure tube there is provided a part 90 between the guide bodies 43, the body 90 having channels 91 so formed therein that they effect guidance of the inflowing coolant out of the intermediate space between the pressure tube 40 and the guide body 43 of one-half of the assembly into the channels 44 within the guide member 43 of the other half of the assembly. The corresponding conformation of the channels is indicated in FIGS. 11 through 17, which are taken on the sections of FIG. 9 previously identified.

It is also possible in accordance with the invention to construct a pressure tube in which the coolant is fed from the ends into a central channel to the middle of the pressure tube, the fissionable material being disposed in a space between the axial channel and the pressure tube itself. In this embodiment, however, there customarily appears a somewhat higher temperature for the pressure tube. This embodiment has, however, certain advantages with respect to the embodiments hereinabove described. Thus, the pressure loss in the coolant in the supply channel to the center of the tube is for the same cross-section somewhat smaller because of the smaller surface of the channel. Additionally, there will occur in the center of the pressure tube a smaller depression in neutron flow, which is advantageous with respect to the uniform combustion or exhaustion of the fissionable material. This embodiment is schematically indicated in FIG. 18. In this figure there are provided in the moderator portion 100 of a reactor a large number of pressure tubes 101, of which a single one is illustrated for purposes of clarity. In this tube there are disposed two coaxial inner tubes 102 and 103 which reach not quite to the center. Between these tubes there is provided a streaming space 104 extending radially outward. Between the inner tubes 102 and the pressure tube 101 fissionable material bodies 103 are disposed. The pressure tube is provided with a heat insulating layer 106 which may be made of ceramic material or of graphite. The flow of coolant occurs in the direction indicated by the arrows. It is to be understood that in this embodiment the partition as shown in FIG. 2 may find application, analogously as in FIGS. 9 to 17. It is also possible to undertake a corresponding modification of the embodiment of FIGS. 4 to 6, the central channels in the guide bodies 43 being in such modification without fissionable material and these channels being connected to the lead-in channel for the coolant and the diameter of the parts 43 being selected so large that only a small intermediate space is left between the guide portion 43 and the pressure tube 40. It is also possible to lead in the coolant from only one end of the tube e.g., through an inner tube 102 only, the embodiment of FIG. 18, as may under certain circumstances be advantageous.

Referring again to the embodiment of FIGS. 4, 5 and 6, it will be seen that the pressure tube construction thereof embodies applicant's invention as illustrated in FIGS. 1, 2 and 18. Considering FIGS. 4 and 6 together, the outer pressure-resistant tubular shell 1 of FIGS. 1 and 2, built to withstand the pressure of the cooling medium, finds in FIGS. 4 and 6 its counterpart in the tubes 40 and 45 which together provide a tubular pressure-tight enclosure extending from the top of FIG. 4 to the bottom of FIG. 6. In the embodiment of FIGS. 4 and 6 the inner tube is in two sections, as illustrated in FIG. 2. Thus, corresponding to the inner tube 20 of FIG. 2 there is provided in the upper half of the tube of FIGS. 4 and 6 an inner tube which comprises together the tube 46 (with the heat insulating jacket 55 affixed thereto) and the outer wall of the guide members 43 seen in FIG. 4. The interruptions between successive guide members 43 provide access to the channels 44 within those guide members, so that these interruptions correspond to the openings 11 of FIG. 1 and to the access between the exterior and interior of the inner tube 20 of FIG. 2 available in FIG. 2 between tube 20 and partition 23.

In the lower half of the pressure tube of FIGS. 4 and 6, illustrated in FIG. 6, the inner tube (corresponding to tube 21 of FIG. 2) comprises the tube 66 (with its heat insulating jacket 63 affixed thereto), and the outer walls of the guide bodies 43 which cooperate with the integral structure of tubes 63 and 66 in the same manner as above explained with reference to the tube 46 and the guide bodies 43 of the upper half of the tube shown in FIG. 4.

Thus, referring to FIG. 4, the coolant flows in at connection 50 and flows downwardly between the pressure tube 45 and its continuation 40 on the one hand, and the inner tube 46, 55 continued as the outer surface of the guide bodies 43 on the other hand. It then flows radially inwardly into the channels 44 inside the guide bodies 43. In these channels 44 the coolant medium flows upwardly over the bodies 60 of fissionable material disposed in those channels, thence through the annular space between the radiation shielding member 54 and the inside wall of the tube 46, upwardly through the remainder of tube 46, into the chamber 49 and out through the coolant flow connection 51. In FIG. 6 the coolant flows into chamber 48 and then upwardly through the annular space between the pressure tube 40 and the tube 63 inside it. It then flows radially inwardly at the separations between the successive guide members 43 in FIG. 6 and into the channels 44 of those members. In these channels it flows downwardly over the bodies of fissionable material, then past the radiation shielding member 54, and out through the chamber 49 and outlet conduit 51. The terms "upward" and "downward" of course refer only to the orientation indicated by the drawings and do not imply any restriction on the scope of the invention.

Applicant's invention is thus seen to be an arrangement whereby the flow of coolant through the pressure tube is such that, at least as regards its flow over the bodies of fissionable material, the flow begins at the mid-portion of the tube, which is in practice disposed in the heart of the reactor core. The flow extends from this mid-portion toward both outer ends in the embodiments of FIGS. 1, 2 and 4 to 6. This is achieved, in the embodiments of FIGS. 1, 2, and 4 to 6, by introducing the coolant at both ends and causing it to flow toward the middle of the tube in the outer annular space between the pressure tube and the "inner" tube. At the middle of the tube (i.e., as regards the length of the tube) the coolant reverses its direction of flow lengthwise of the tube, and flows, in heat exchange relation with the fissionable bodies, toward both ends of the tube through the inner space inside the inner tube. As indicated in FIG. 18, these embodiments may be modified by causing the cold coolant to flow along the axis of the pressured tube toward the mid-point thereof and thence in heat exchange relation with the fissionable bodies 105 back toward the two ends of the tube through the annular space between the pressure tube itself and the inner tube, shown in two sections at 102 and 103 in FIG. 18.

In another embodiment illustrated in FIGS. 9 to 17, there is no reversal in direction of coolant flow at the mid-point of the tube. Instead, half of the coolant enters the tube at one end, and the other half enters the tube at the other end. In accordance with applicant's invention however, both of these halves of the coolant are led without substantial heating to the mid-point of the tube before being brought into heat exchange relation with the fissionable material whose heat is to be extracted from the reactor. At the mid-point of the tube each half of the coolant flow is guided into channels containing bodies of fissionable material and each flow continues in the same direction axially of the tube as before but in heat exchange relation with the fissionable bodies to flow out of the tube at the end thereof opposite the one at which such flow began. Thus, as in the embodiments of FIGS. 1, 2, 4 to 6 and 18, the coolant reaches the mid-point of the tube at the location of maximum heat evolution in an unheated condition to pick up heat during flow over a path extending, from such mid-point, one half the length of the tube to an exit therefrom.

As previously stated however, all of the coolant may flow over a single path from the exterior to the (approximate) mid-point of the tubular shell, and thence over separate paths, in heat exchange relation with fissionable bodies, to the ends of the tubular shell.

The invention thus provides in all embodiments a coolant flow tube for a nuclear reactor comprising an outer pressure-resistant tubular shell, and at least one inner tube extending from one end of the shell to a location intermediate the ends of the shell. In terms of the embodiment of FIG. 18, this outer tubular shell is indicated at 101 and the inner tube finds embodiment either in a single one or in both of the tubes 102 and 103. The location intermediate the ends of the shell to which the inner tube or tubes extend is preferably near the mid-point of the shell so that it may be positioned close to the heart of the reactor core. This inner tube defines with the shell at least one channel extending between one end of the shell and that location, through which coolant may be brought from the exterior of the shell to the mid-point thereof without substantial heating. This channel may be either inside the inner tube or between the inner tube and the tubular shell. The inner tube defines with the shell, in addition, at least two channels extending each between the said location and a separate end of the shell. Fissionable bodies are disposed in each of these two last-mentioned channels and the coolant medium flows through them, from the location at or near the mid-point of the shell, to the ends of the shell in order to abstract heat from those fissionable bodies. The coolant medium so heated is withdrawn at the two ends of the shell for utilization of the heat so abstracted.

I claim:

1. Coolant flow apparatus for a nuclear reactor comprising an outer pressure-resistant tubular shell, two tubes within said shell each extending from a separate end of the shell toward the middle thereof, each of said tubes defining an inner axial flow path within that tube and further defining with said shell an outer annular flow path outside that tube, each of said outer flow paths having access to a separate one of said inner flow paths at the adjacent ends of said tubes, separate coolant inlet means connecting with each of said outer flow paths adjacent the ends of said shell, separate coolant outlet means connecting with each of said inner flow paths adjacent the ends of said shell, a body of fissionable material within each of said tubes, and radiation-shielding means disposed within each of said tubes between the said body within that tube and the coolant outlet means connecting with the inner flow path defined by that tube.

References Cited

UNITED STATES PATENTS

| | | | |
|---|---|---|---|
| 3,047,487 | 7/1962 | Cannon | 176—59 |
| 3,179,573 | 4/1965 | Maillet | 176—61 X |
| 2,708,656 | 5/1955 | Fermi et al. | 176—41 |
| 3,165,449 | 1/1965 | Bradley | 176—59 |
| 3,208,915 | 9/1965 | Campbell et al. | 176—61 X |

FOREIGN PATENTS

| | | |
|---|---|---|
| 806,985 | 1/1959 | Great Britain. |
| 1,254,435 | 1/1961 | France. |
| 1,117,787 | 11/1961 | Germany. |

REUBEN EPSTEIN, *Primary Examiner.*